(12) United States Patent
Read et al.

(10) Patent No.: US 10,789,800 B1
(45) Date of Patent: Sep. 29, 2020

(54) SYSTEMS AND METHODS FOR AUTHORIZING TRANSMISSION OF COMMANDS AND SIGNALS TO AN ACCESS CONTROL DEVICE OR A CONTROL PANEL DEVICE

(71) Applicant: Ademco Inc., Golden Valley, MN (US)

(72) Inventors: Travis Read, Little Canada, MN (US); Andrew Covi, Golden Valley, MN (US)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 16/422,202

(22) Filed: May 24, 2019

(51) Int. Cl.
  *G07C 9/38* (2020.01)
(52) U.S. Cl.
  CPC .................................. *G07C 9/38* (2020.01)
(58) Field of Classification Search
  CPC ............................................................ G07C 9/38
  See application file for complete search history.

(56) References Cited

U.S. PATENT DOCUMENTS

| | | |
|---|---|---|
| 4,864,519 A | 9/1989 | Appleby et al. |
| 4,916,460 A | 4/1990 | Powell |
| 5,039,995 A | 8/1991 | Hulbert |
| 5,156,203 A | 10/1992 | Funakoshi et al. |
| 5,178,191 A | 1/1993 | Schaefer |
| 5,218,356 A | 6/1993 | Knapp |
| 5,224,648 A | 7/1993 | Simon et al. |
| 5,316,073 A | 5/1994 | Klaus et al. |
| 5,355,305 A | 10/1994 | Seem et al. |
| 5,379,455 A | 1/1995 | Koschek |
| 5,414,640 A | 5/1995 | Seem |
| 5,506,768 A | 4/1996 | Seem et al. |

(Continued)

FOREIGN PATENT DOCUMENTS

| | | |
|---|---|---|
| AU | 660906 B2 | 7/1995 |
| CA | 2125694 A1 | 5/1994 |

(Continued)

OTHER PUBLICATIONS

English language translation of bibliographic data and abstract of CN103942863 (A).

(Continued)

*Primary Examiner* — Sisay Yacob
(74) *Attorney, Agent, or Firm* — Fredrikson & Byron, P.A.

(57) ABSTRACT

Systems and methods are provided that can include a doorbell device receiving a request signal to enter a region associated with the doorbell device from a remote control device and, responsive thereto, accessing a list identifying which of a plurality of authorized users are located within the region, identifying one of the plurality of authorized users associated with the remote control device, determining whether the list indicates that the one of the plurality of authorized users is located within the region, and determining whether to transmit a disarm command signal to a control panel device or an activation signal to an access control device based on whether the list indicates that the one of the plurality of authorized users is located within the region, wherein entries on the list can correspond to historical use of the doorbell device or the control panel device to enter and exit the region.

18 Claims, 2 Drawing Sheets

(56) References Cited

U.S. PATENT DOCUMENTS

| | | |
|---|---|---|
| 5,550,752 A | 8/1996 | Federspiel |
| 5,555,195 A | 9/1996 | Jensen et al. |
| 5,555,196 A | 9/1996 | Asano |
| 5,568,377 A | 10/1996 | Seem et al. |
| 5,590,830 A | 1/1997 | Kettler et al. |
| 5,682,329 A | 10/1997 | Seem et al. |
| RE35,736 E | 2/1998 | Powell |
| 5,737,318 A | 4/1998 | Melnik |
| 5,762,265 A | 6/1998 | Kitamura et al. |
| 5,769,315 A | 6/1998 | Drees |
| 5,791,408 A | 8/1998 | Seem |
| 5,867,384 A | 2/1999 | Drees et al. |
| 5,960,214 A | 9/1999 | Sharpe, Jr. et al. |
| 6,006,142 A | 12/1999 | Seem et al. |
| 6,014,546 A | 1/2000 | Georges et al. |
| 6,033,302 A | 3/2000 | Ahmed et al. |
| 6,095,426 A | 8/2000 | Ahmed et al. |
| 6,122,605 A | 9/2000 | Drees et al. |
| 6,141,595 A | 10/2000 | Gloudeman et al. |
| 6,219,590 B1 | 4/2001 | Bernaden, III et al. |
| 6,219,950 B1 | 4/2001 | Hsu |
| 6,223,544 B1 | 5/2001 | Seem |
| 6,265,843 B1 | 7/2001 | West et al. |
| 6,296,193 B1 | 10/2001 | West et al. |
| 6,353,853 B1 | 3/2002 | Gravlin |
| 6,369,716 B1 | 4/2002 | Abbas et al. |
| 6,389,331 B1 | 5/2002 | Jensen et al. |
| 6,400,265 B1 | 6/2002 | Saylor et al. |
| 6,408,228 B1 | 6/2002 | Seem et al. |
| 6,415,617 B1 | 7/2002 | Seem |
| 6,437,692 B1 | 8/2002 | Petite et al. |
| 6,477,439 B1 | 11/2002 | Bernaden, III et al. |
| 6,480,889 B1 | 11/2002 | Saito et al. |
| 6,486,778 B2 | 11/2002 | Mahler et al. |
| 6,594,554 B1 | 7/2003 | Seem et al. |
| 6,759,956 B2 | 7/2004 | Menard et al. |
| 6,816,811 B2 | 11/2004 | Seem |
| 6,826,607 B1 | 11/2004 | Gelvin et al. |
| 6,829,513 B2 | 12/2004 | Piersanti et al. |
| 6,842,430 B1 | 1/2005 | Melnik |
| 6,862,540 B1 | 3/2005 | Welch et al. |
| 6,874,691 B1 | 4/2005 | Hildebrand et al. |
| 6,898,542 B2 | 5/2005 | Ott et al. |
| 6,916,239 B2 | 7/2005 | Siddaramanna et al. |
| 6,919,790 B2 | 7/2005 | Kanazawa |
| 6,937,909 B2 | 8/2005 | Seem |
| 6,959,356 B2 | 10/2005 | Packwood et al. |
| 7,010,294 B1 | 3/2006 | Pyotsia et al. |
| 7,031,880 B1 | 4/2006 | Seem et al. |
| 7,053,767 B2 | 5/2006 | Petite et al. |
| 7,053,770 B2 | 5/2006 | Ratiu et al. |
| 7,065,349 B2 | 6/2006 | Nath et al. |
| 7,085,623 B2 | 8/2006 | Siegers |
| 7,089,089 B2 | 8/2006 | Cumming et al. |
| 7,103,511 B2 | 9/2006 | Petite |
| 7,124,637 B2 | 10/2006 | Singhal et al. |
| 7,130,719 B2 | 10/2006 | Ehlers et al. |
| 7,132,757 B2 | 11/2006 | Steigerwald et al. |
| 7,148,803 B2 | 12/2006 | Bandy et al. |
| 7,170,201 B2 | 1/2007 | Hamel et al. |
| 7,176,601 B2 | 2/2007 | Tanaka et al. |
| 7,251,570 B2 | 7/2007 | Hancock et al. |
| 7,284,372 B2 | 10/2007 | Crow |
| 7,317,927 B2 | 1/2008 | Staton et al. |
| 7,321,316 B2 | 1/2008 | Hancock et al. |
| 7,349,360 B2 | 3/2008 | Gutierrez et al. |
| 7,363,031 B1 | 4/2008 | Aisa |
| 7,378,980 B2 | 5/2008 | McFarland |
| 7,379,390 B2 | 5/2008 | McFarland |
| 7,382,271 B2 | 6/2008 | McFarland |
| 7,388,886 B2 | 6/2008 | Perkins et al. |
| 7,406,300 B2 | 7/2008 | Pan |
| 7,426,452 B2 | 9/2008 | Zielinski et al. |
| 7,433,740 B2 | 10/2008 | Hesse et al. |
| 7,436,797 B2 | 10/2008 | Shepard et al. |
| 7,468,661 B2 | 12/2008 | Petite et al. |
| 7,479,727 B1 | 1/2009 | Grace |
| 7,496,472 B2 | 2/2009 | Seem |
| 7,545,267 B2 | 6/2009 | Stortoni |
| 7,554,941 B2 | 6/2009 | Ratiu et al. |
| 7,559,529 B2 | 7/2009 | Affaticati et al. |
| 7,586,888 B2 | 9/2009 | Wang |
| 7,623,826 B2 | 11/2009 | Pergal |
| 7,640,007 B2 | 12/2009 | Chen et al. |
| 7,653,010 B2 | 1/2010 | Ensor et al. |
| 7,653,394 B2 | 1/2010 | McMillin |
| 7,660,701 B2 | 2/2010 | Sharpe, Jr. |
| 7,660,892 B2 | 2/2010 | Choong et al. |
| 7,728,715 B2 | 6/2010 | Riedel et al. |
| 7,729,882 B2 | 6/2010 | Seem |
| 7,751,828 B2 | 7/2010 | Kim et al. |
| 7,752,309 B2 | 7/2010 | Keyghobad et al. |
| 7,799,560 B2 | 9/2010 | Wilson et al. |
| 7,827,813 B2 | 11/2010 | Seem |
| 7,869,805 B2 | 1/2011 | Schnaare et al. |
| 7,898,147 B2 | 3/2011 | Grabinger et al. |
| 7,908,126 B2 | 3/2011 | Bahel et al. |
| 7,970,350 B2 | 6/2011 | Sheynman et al. |
| 8,005,514 B2 | 8/2011 | Saito et al. |
| 8,027,742 B2 | 9/2011 | Seem et al. |
| 8,036,594 B2 | 10/2011 | Schadler |
| 8,049,361 B2 | 11/2011 | Kielb et al. |
| 8,255,090 B2 | 8/2012 | Frader-Thompson et al. |
| 8,281,174 B2 | 10/2012 | Seiler |
| 8,370,483 B2 | 2/2013 | Choong et al. |
| 8,665,084 B2 | 3/2014 | Shapiro et al. |
| 8,725,081 B2 | 5/2014 | Kantzes et al. |
| 8,929,948 B2 | 1/2015 | Vanderaa et al. |
| 8,933,778 B2 | 1/2015 | Birkel et al. |
| 9,008,804 B2 | 4/2015 | Junk et al. |
| 9,024,717 B2 | 5/2015 | Songakul et al. |
| 9,049,212 B2 | 6/2015 | Segre |
| 9,119,236 B1 | 8/2015 | Martin |
| 9,141,150 B1 | 9/2015 | Trundle et al. |
| 9,235,980 B2 | 1/2016 | Sharma et al. |
| 9,679,453 B2 | 6/2017 | Flint et al. |
| 9,697,656 B2 | 7/2017 | Trani |
| 9,729,342 B2 | 8/2017 | Cohn et al. |
| 2002/0152298 A1 | 10/2002 | Kikta et al. |
| 2003/0101009 A1 | 5/2003 | Seem |
| 2003/0151513 A1 | 8/2003 | Herrmann et al. |
| 2003/0160693 A1 | 8/2003 | Hisano |
| 2003/0216837 A1 | 11/2003 | Reich et al. |
| 2004/0235468 A1 | 11/2004 | Luebke et al. |
| 2005/0113943 A1 | 5/2005 | Nian |
| 2005/0228509 A1 | 10/2005 | James |
| 2005/0285716 A1 | 12/2005 | Denison et al. |
| 2006/0007945 A1 | 1/2006 | Schoettle et al. |
| 2006/0063522 A1 | 3/2006 | McFarland |
| 2006/0063523 A1 | 3/2006 | McFarland |
| 2006/0104197 A1 | 5/2006 | Proctor et al. |
| 2006/0193262 A1 | 8/2006 | McSheffrey et al. |
| 2007/0097993 A1 | 5/2007 | Bojahra et al. |
| 2007/0191075 A1 | 8/2007 | Greene et al. |
| 2008/0024267 A1* | 1/2008 | Jones .................. B60R 25/24 340/5.1 |
| 2008/0179408 A1 | 7/2008 | Seem |
| 2008/0277486 A1 | 11/2008 | Seem et al. |
| 2008/0290986 A1 | 11/2008 | Laughlin-Parker et al. |
| 2009/0045939 A1 | 2/2009 | Holland et al. |
| 2009/0065596 A1 | 3/2009 | Seem et al. |
| 2009/0136231 A1 | 5/2009 | Lai |
| 2009/0265583 A1 | 10/2009 | Bouse et al. |
| 2009/0307255 A1 | 12/2009 | Park |
| 2010/0121968 A1 | 5/2010 | Clark |
| 2012/0280790 A1 | 11/2012 | Gerhardt et al. |
| 2014/0049361 A1* | 2/2014 | Ahearn .............. G07C 9/00309 340/5.7 |
| 2015/0204561 A1 | 7/2015 | Sadwick et al. |
| 2015/0227734 A1 | 8/2015 | Mucci et al. |
| 2015/0229626 A1 | 8/2015 | Hauhn |
| 2016/0020910 A1 | 1/2016 | Jones et al. |
| 2016/0047565 A1 | 2/2016 | Robinson |

(56) References Cited

U.S. PATENT DOCUMENTS

| | | | |
|---|---|---|---|
| 2016/0055692 A1* | 2/2016 | Trani | G07C 9/20 |
| | | | 340/5.61 |
| 2016/0055698 A1 | 2/2016 | Gudmundsson et al. | |
| 2016/0063853 A1 | 3/2016 | Mi | |
| 2016/0116177 A1 | 4/2016 | Sikora et al. | |
| 2016/0163137 A1* | 6/2016 | Strulovitch | G07C 9/28 |
| | | | 340/5.61 |
| 2016/0217638 A1* | 7/2016 | Child | H04L 12/2803 |
| 2016/0258640 A1 | 9/2016 | Grabinger et al. | |
| 2018/0129885 A1 | 5/2018 | Potter et al. | |
| 2018/0139332 A1* | 5/2018 | Kerzner | H04L 67/22 |

FOREIGN PATENT DOCUMENTS

| | | |
|---|---|---|
| CN | 1291704 A | 4/2001 |
| CN | 1804744 A | 7/2006 |
| CN | 2833675 Y | 11/2006 |
| CN | 1969239 A | 5/2007 |
| CN | 101112077 A | 1/2008 |
| CN | 101299299 A | 11/2008 |
| CN | 103942863 A | 7/2014 |
| CN | 105871874 A | 8/2016 |
| CN | 107170092 A | 9/2017 |
| DE | 69311314 T2 | 10/1997 |
| DE | 19832579 A1 | 3/1999 |
| DE | 10038233 A1 | 2/2001 |
| DE | 69808393 T2 | 6/2003 |
| DE | 102004032050 A1 | 3/2005 |
| EP | 0628181 B1 | 6/1997 |
| EP | 1072847 A2 | 1/2001 |
| EP | 0892330 B1 | 10/2002 |
| EP | 0957418 B1 | 1/2003 |
| EP | 1300771 A2 | 4/2003 |
| EP | 1309062 A2 | 5/2003 |
| EP | 2763106 A2 | 8/2014 |
| EP | 2858385 A1 | 4/2015 |
| EP | 3 445 046 A1 | 2/2019 |
| JP | 2001050599 A | 2/2001 |
| JP | 2001082786 A | 3/2001 |
| JP | 3242881 B2 | 12/2001 |
| JP | 3358661 B2 | 12/2002 |
| JP | 3370673 B2 | 1/2003 |
| JP | 2003162324 A | 6/2003 |
| JP | 2003242212 A | 8/2003 |
| JP | 2005044349 A | 2/2005 |
| SU | 535103 A1 | 11/1976 |
| WO | 9530114 A1 | 11/1995 |
| WO | 9729329 A2 | 8/1997 |
| WO | 0068744 A1 | 11/2000 |
| WO | 03023536 A1 | 3/2003 |
| WO | 2006053211 A2 | 5/2006 |
| WO | 2008127580 A2 | 10/2008 |
| WO | 2009012269 A2 | 1/2009 |
| WO | 2009012282 A2 | 1/2009 |
| WO | 2009018215 A1 | 2/2009 |
| WO | WO 2016/130777 A1 | 8/2016 |

OTHER PUBLICATIONS

English language translation of bibliographic data and abstract of CN105871874 (A).

English language translation of bibliographic data and abstract of CN107170092 (A).

American Society of Heating, Refrigerating and Air-Conditioning Engineers, Inc., "ASHRAE Addenda a,b,c,d, and g to ANSI/ASHRAE Standard 62,1-2004," 28 pages, 2006.

Bristol "On a New Measure of Interaction for Multivariable Process Control," IEEE Transactions on Automatic Control, vol. AC-11, No. 1, pp. 133-134, Jan. 1966.

Castellanos, "Nest Competitor Zstat Launches Crowdfunding for Wireless Thermostat," downloaded from http://www.bizjournals.com/boston/blog/startups/2014/01/nest-comp . . . , 2 pages, printed Sep. 12, 2014.

Castelvecchi, "Wireless Energy May Power Electronics," MIT TechTalk, vol. 51, No. 9, 8 pages, Nov. 15, 2006.

Churchill et al., "Strain Energy Harvesting for Wireless Sensor Networks," Proceedings of SPIE, vol. 5055, pp. 319-327, 2003.

Fountain et al., "Comfort Control for Short-Term Occupancy," Energy and Buildings, vol. 21, pp. 1-13, 1994.

Hosni et al., "Experimental Results for Heat Gain and Radiant/Convective Split from Equipment in Buildings," ASHRAE Transactions 1999, vol. 5, Part 2, 13 pages, 1999.

Karalis et al., "Wireless Non-Radiative Energy Transfer," 17 pages, prior to Mar. 4, 2015.

Katz, "Residential Piezoelectric Energy Sources," del, 7 pages, Jul. 21, 2004.

Kaushal et al., "Environmental Control Including Ventilation in Hospitals," JK Science, Hospital Notes, vol. 6, No. 4, pp. 229-232, Oct.-Dec. 2004.

Lawrence et al., "Adaptive Thermostat With Bluetooth Technology," ECE4007L02, Group 7, Georgia Institute of Technology, 15 pages, downloaded Apr. 27, 2015.

Lowton et al., "Finding NEMO: On the Accuracy of Inferring Location in IEEE 802.15.4 Networks," ACM, 5 pages, 2006.

Minkel, "Wireless Energy Transfer May Power Devices at a Distance," downloaded from http://www.scientificamerican.com/article/wireless-energy-transfer/, 3 pages, Nov. 14, 2006.

Ramachandran, "Establishing a Regulatory Framework for Distributed Antenna Systems," Thesis Submitted to University of Colorado, 76 pages, 2008.

Rice et al., "An Evaluation of Hospital Special-Ventilation-Room Pressures," Infection Control and Hospital Epidemiology, vol. 22, No. 1, pp. 19-23, Jan. 2001.

Thomas et al., "Feed-Forward in Temperature Control of Buildings," Energy and Buildings, vol. 37, pp. 755-761, 2005.

Extended European Search Report for corresponding EP Application No. 17188515.5, dated Jan. 18, 2018.

Canadian Office Action for corresponding Canadian Application No. 2,977,773, dated May 3, 2019.

* cited by examiner

SYSTEMS AND METHODS FOR AUTHORIZING TRANSMISSION OF COMMANDS AND SIGNALS TO AN ACCESS CONTROL DEVICE OR A CONTROL PANEL DEVICE

FIELD

The present invention relates generally to security systems and access control systems. More particularly, the present invention relates to systems and methods for authorizing transmission of commands and signals to an access control device or a control panel device.

BACKGROUND

Known security systems and access control systems can receive commands and signals from a remote control device. However, such systems do not determine a location of an authorized user of the remote control device prior to authorizing transmission of the commands or the signals to an access control device or a control panel device.

In view of the above, there is a need and an opportunity for improved systems and methods.

DETAILED DESCRIPTION

Figure 1:
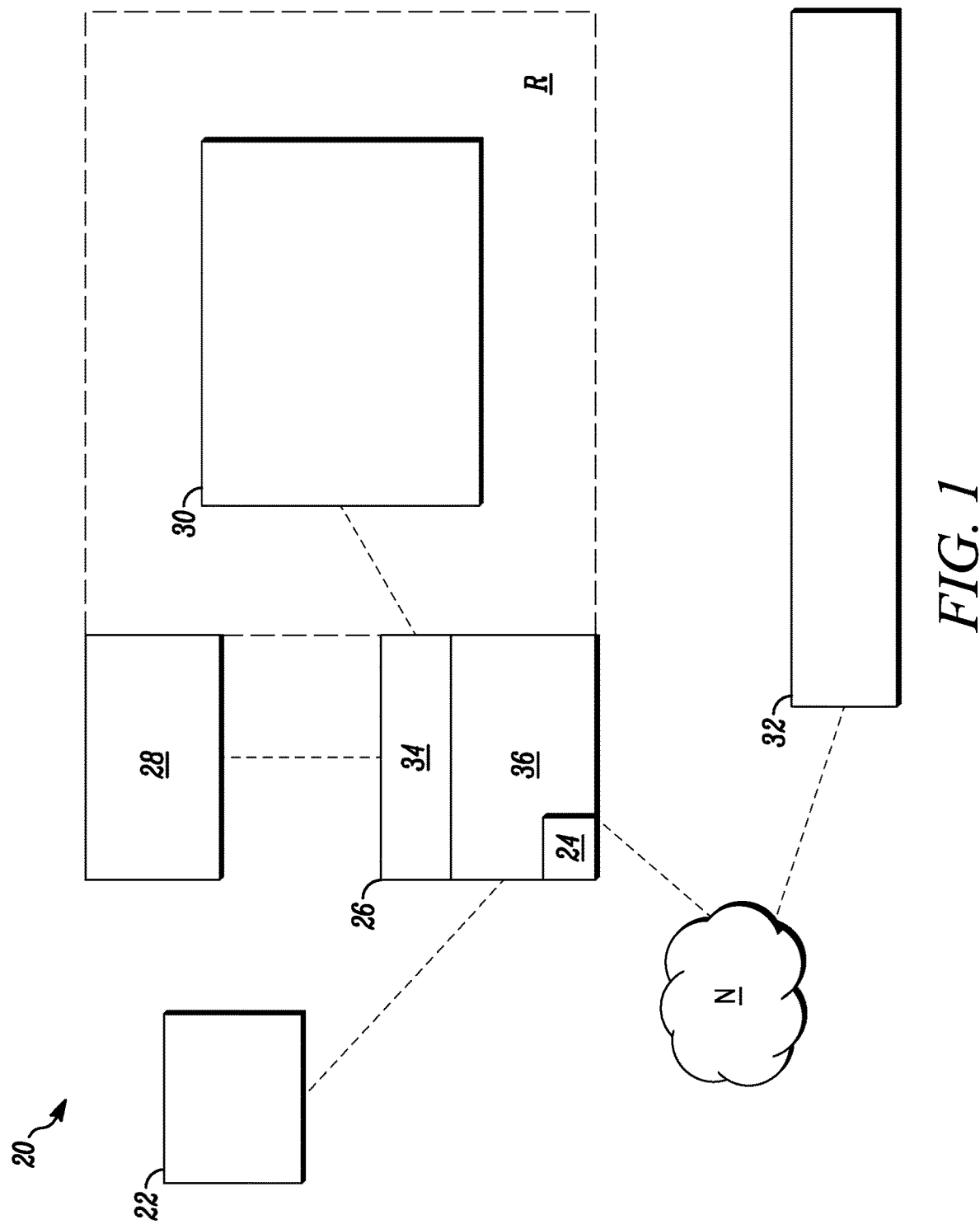
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for tracking historical use of a doorbell device or a control panel device to enter or exit a region to determine a location of an authorized user of a remote control device prior to authorizing transmission of commands or signals to an access control device or the control panel device. Accordingly, such systems and methods can prevent an unauthorized user of the remote control device, such as a thief, from using the remote control device to gain access to the region when the authorized user is located within the region.

For example, such systems and methods can include the doorbell device receiving a request signal to enter the region associated with the doorbell device from the remote control device. Responsive to receiving the request signal, the doorbell device can access a list identifying which of a plurality of authorized users are located within the region, identify one of the plurality of authorized users associated the remote control device, and determine whether the list indicates that the one of the plurality of authorized users is located within the region. Then, the doorbell device, the control panel device, and/or a cloud server device can determine whether to transmit a disarm command signal to the control panel device or an activation signal to the access control device based on whether the list indicates that the one of the plurality of authorized users is located within the region.

In some embodiments, entries on the list can correspond to the historical use of the doorbell device or the control panel device by the plurality of authorized users to enter and exit the region. For example, when the one of the plurality of authorized users uses the doorbell device or the control panel device to enter the region, the doorbell device, the control panel device, and/or the cloud server device can add the one of the plurality of authorized users to the list. However, when the one of the plurality of authorized users uses the doorbell device or the control panel device to exit the region, the doorbell device, the control panel device, and/or the cloud server device can remove the one of the plurality of authorized users from the list. In some embodiments, the doorbell device, the control panel device, and/or the cloud server device can update the list in real time and/or periodically by accessing user input received by the doorbell device and the control panel device.

In some embodiments, when the list indicates that the one of the plurality of authorized users is located within the region, the doorbell device can refrain from transmitting the disarm command signal and the activation signal. However, in some embodiments, when the list fails to indicate that the one of the plurality of authorized users is located within the region, the doorbell device can transmit the disarm command signal or the activation signal.

In some embodiments, the list and a table or other cross-referencing device identifying a respective one of a plurality of remote control devices associated with each of the plurality of authorized users can be stored on a database device, and in some embodiments, the database device can be a standalone device or can be part of the doorbell device, the control panel device, or the cloud server device. For example, in embodiments in which the database device is part of the control panel device, the doorbell device can communicate with the control panel device to access the table or other cross-referencing device for identifying the one of the plurality of authorized users and to access the list for determining whether the list indicates that the one of the plurality of authorized users is located within the region. Similarly, in embodiments in which the database device is part of the cloud server device, the doorbell device can communicate with the cloud server device to access the table or other cross-referencing device for identifying the one of the plurality of authorized users and to access the list for determining whether the list indicates that the one of the plurality of authorized users is located within the region.

In some embodiments, responsive to transmitting the disarm command signal or the activation signal, the doorbell device can update the list to add the one of the plurality of authorized users to the list. For example, in embodiments in which the database device is part of the control panel device, the doorbell device can transmit an update signal to the control panel device to update the list. Similarly, in embodiments in which the database device is part of the cloud server device, the doorbell device can transmit the update signal to the cloud server device to update the list.

In some embodiments, the doorbell device can receive access credentials with the request signal, and in these embodiments, the doorbell device can determine whether the access credentials are valid and refrain from accessing the list when the access credentials are invalid.

In some embodiments, when the doorbell device refrains from transmitting the disarm command signal and the activation signal, the doorbell device can initiate a security action. For example, in some embodiments, the security action can include the doorbell device transmitting a warning signal to a mobile device that is different from the remote control device or to the control panel device, either of which, under certain conditions or responsive to user input, can authorize the doorbell device to transmit the disarm command signal or the activation signal even though the list indicates that the one of the plurality of authorized users is located within the region. Additionally or alternatively, in some embodiments, the security action can include the doorbell device transmitting an alarm signal to the control panel device or transmitting a locking signal to the remote control device. Additionally or alternatively, in some embodiments, the security action can include the doorbell device capturing an image of a person proximate to the doorbell device and transmitting the image to an owner or an occupant of the region.

In some embodiments, the remote control device can include a mobile device, a smart phone, a tablet, a portable programmable device, or a low powered device, such as a wireless dongle, a smart watch, or a keyfob. Furthermore, in some embodiments, the doorbell device can include a transceiver device for transmitting signals to and receiving signals from the remote control device, the control panel device, the access control device, and the cloud server device and a programmable processor for executing the methods disclosed herein.

In some embodiments, the doorbell device can be positioned proximate to the region, for example, on an exterior of the region. Furthermore, in some embodiments, the doorbell device can include a camera device for monitoring the exterior of the region and/or receiving information, such as the request signal, from the remote control device. Additionally or alternatively, in some embodiments, the doorbell device can include a user interface, such as a button, that, when activated, can cause the doorbell device to notify the owner or the occupant of the region about a presence of the person proximate to the doorbell device, for example, by emitting a sound or a tone or within the region or by transmitting an informational signal to a portable device associated with the owner.

FIG. 1 is a block diagram of a system 20 in accordance with disclosed embodiments. As seen in FIG. 1, the system 20 can include a remote control device 22, a database device 24, a doorbell device 26 associated with a region R, an access control device 28 that controls access to the region R, and a control panel device 30 that monitors the region R. In some embodiments, the system 20 can also include a cloud server device 32 that communicates with the doorbell device 26 and/or the other devices of the system 20 via a network N, such as the internet.

As seen in FIG. 1, the doorbell device 26 can include a transceiver device 34 and a programmable processor 36, and in some embodiments, the transceiver device 34 can include one or more communication modules for communicating with the remote control 22, the access control device 28, the control panel device 30, and/or the cloud server device 32 via any known wireless or wired communication medium (e.g. Wi-Fi, cellular, Bluetooth, cable, phone line, Ethernet, fiber, etc.). As also seen in FIG. 1, in some embodiments, the database device 24 can be part of the doorbell device 26. However, in some embodiments, the database device 24 can be a standalone device or can be part of the control panel device 30 and/or the cloud server device 32.

Figure 2:
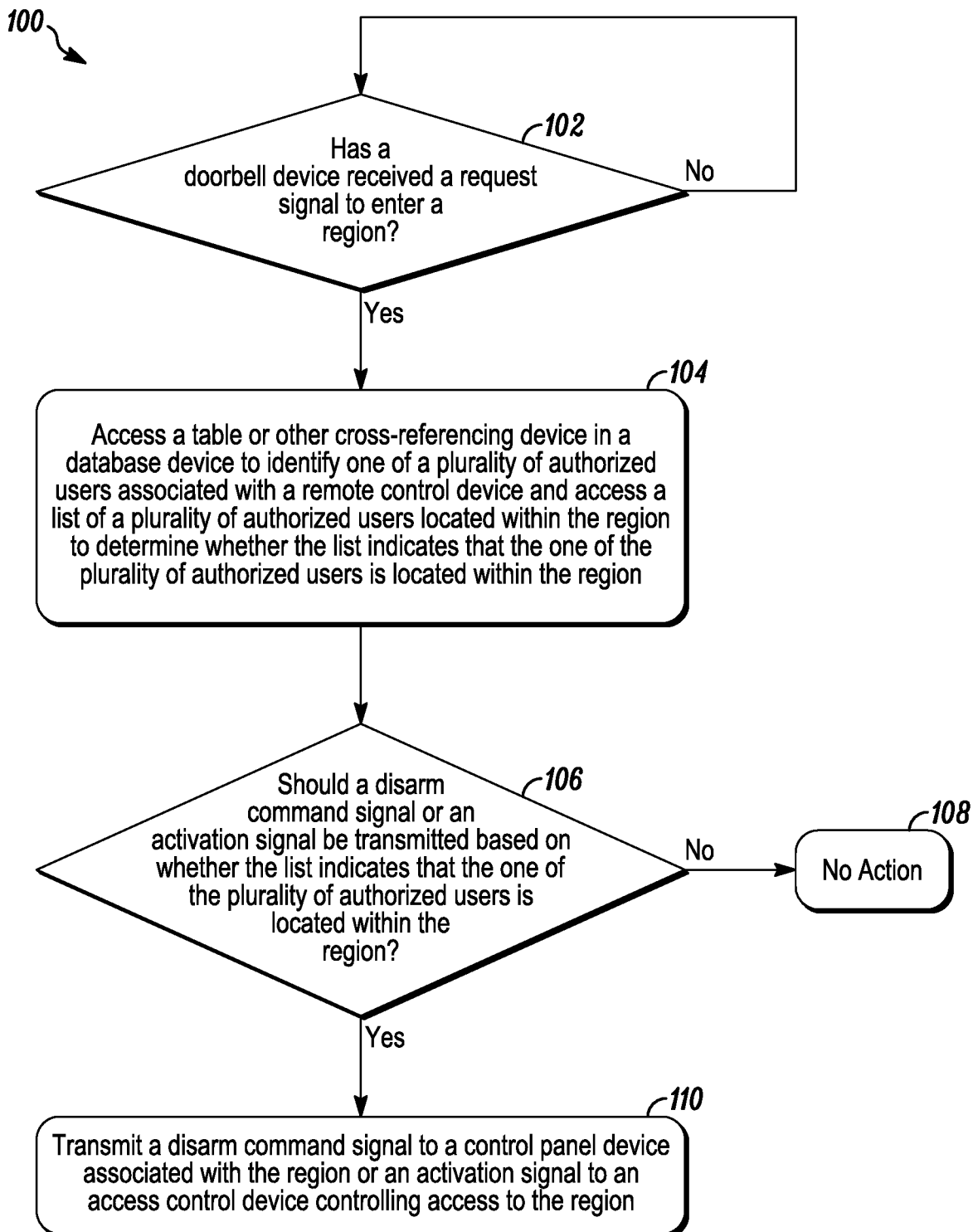
FIG. 2 is a flow diagram of a method in accordance with disclosed embodiments.

FIG. 2 is a flow diagram of a method 100 in accordance with disclosed embodiments. As seen in FIG. 2, the method 100 can include the programmable processor 36 determining whether the transceiver device 34 has received a request signal to enter the region R, as in 102. If not, then the method 100 can include the programmable processor 36 continuing to determine whether the transceiver device 34 has received the request signal, as in 102. However, when the transceiver device 34 receives the request signal from the remote control device 22, the method 100 can include the programmable processor 36 accessing a table or other cross-referencing device in the database device 24 to identify one of a plurality of authorized users associated with the remote control device 22 and accessing a list of the plurality of authorized users in the database device 24 to determine whether the list indicates that the one of the plurality of authorized users is located within the region, as in 104. In this regard, it is to be understood that the list can identify each of the plurality of authorized users located within the region.

As seen in FIG. 2, after accessing the table or other cross-referencing device in the database device 24 to identify the one of the plurality of authorized users and accessing the list in the database device 24 to determine whether list indicates that the one of the plurality of authorized users is located within the region, the method 100 can include the programmable processor 36 determining whether to transmit a disarm command signal to the control panel device 30 or an activation signal to the access control device 28 based on whether the list indicates that the one of the plurality of authorized users is located within the region, as in 106. When the list indicates that the one of the plurality of authorized users is located within the region, the method 100 can include the transceiver device 34 refraining from transmitting the disarm command signal and the activation signal and the programmable processor 36 taking no action, as in 108, or initiating a security action. However, when the list fails to indicate that the one of the plurality of users is located within the region, the method 100 can include the transceiver device 34 transmitting the disarm command signal or the activation signal, as in 110. In some embodiments, the method 100 can include the programmable processor 36 determining whether the list indicates that the one of the plurality of authorized users is located within the region and whether to transmit the disarm command signal or the activation signal in a single processing step.

In some embodiments, the method 100 can include the transceiver device 34 transmitting the disarm command signal directly to the control panel device 30 or transmitting the activation signal directly to the access control device 28. However, in some embodiments, the method 100 can include the transceiver device 34 transmitting the activation signal to the access control device 28 via an intermediary device, such as the control panel device 30 or the cloud server device 32, or transmitting the disarm command signal to the control panel device 30 via an intermediary device, such as the cloud server device 32.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
a doorbell device receiving a request signal to enter a region associated with the doorbell device from a remote control device;
responsive to receiving the request signal, the doorbell device accessing a list identifying which of a plurality of authorized users are located within the region, identifying one of the plurality of authorized users associated with the remote control device, and determining whether the list indicates that the one of the plurality of authorized users is located within the region;
the doorbell device determining whether to transmit a disarm command signal to a control panel device associated with the region or an activation signal to an access control device controlling access to the region based on whether the list indicates that the one of the plurality of authorized users is located within the region; and
when the list indicates that the one of the plurality of authorized users is located within the region, the doorbell device refraining from transmitting the disarm command signal and the activation signal,
wherein entries on the list correspond to historical use of the doorbell device or the control panel device by the plurality of authorized users to enter and exit the region.

2. The method of claim 1 further comprising:
the doorbell device communicating with the control panel device to access the list, identify the one of the plurality of authorized users, and determine whether the list indicates that the one of the plurality of authorized users is located within the region.

3. The method of claim 1 further comprising:
the doorbell device receiving access credentials with the request signal;
the doorbell device determining whether the access credentials are valid; and
the doorbell device refraining from accessing the list when the access credentials are invalid.

4. The method of claim 1 further comprising:
when the doorbell device refrains from transmitting the disarm command signal and the activation signal, the doorbell device initiating a security action.

5. The method of claim 1 further comprising:
the doorbell device communicating with a cloud server device to access the list, identify the one of the plurality of authorized users, and determine whether the list indicates that the one of the plurality of authorized users is located within the region.

6. A method comprising:
a doorbell device receiving a request signal to enter a region associated with the doorbell device from a remote control device;
responsive to receiving the request signal, the doorbell device accessing a list identifying which of a plurality of authorized users are located within the region, identifying one of the plurality of authorized users associated with the remote control device, and determining whether the list indicates that the one of the plurality of authorized users is located within the region;
the doorbell device determining whether to transmit a disarm command signal to a control panel device associated with the region or an activation signal to an access control device controlling access to the region based on whether the list indicates that the one of the plurality of authorized users is located within the region; and
when the list fails to indicate that the one of the plurality of authorized users is located within the region, the doorbell device transmitting the disarm command signal or the activation signal,
wherein entries on the list correspond to historical use of the doorbell device or the control panel device by the plurality of authorized users to enter and exit the region.

7. The method of claim 6 further comprising:
responsive to transmitting the disarm command signal or the activation signal, the doorbell device updating the list to add the one of the plurality of authorized users to the list.

8. The method of claim 7 further comprising:
the doorbell device transmitting an update signal to the control panel device to update the list.

9. The method of claim 7 further comprising:
the doorbell device transmitting an update signal to a cloud server device to update the list.

10. A doorbell device comprising:
a transceiver device; and
a programmable processor,
wherein the transceiver device receives a request signal to enter a region associated with the doorbell device from a remote control device,
wherein, responsive to receiving the request signal, the programmable processor accesses a list identifying which of a plurality of authorized users are located within the region from a database device, identifies one of the plurality of authorized users associated with the remote control device, and determines whether the list indicates that the one of the plurality of authorized users is located within the region,
wherein the programmable processor determines whether to transmit a disarm command signal to a control panel device associated with the region or an activation signal to an access control device controlling access to the region based on whether the list indicates that the one of the plurality of authorized users is located within the region,
wherein, when the list indicates that the one of the plurality of authorized users is located within the region, the transceiver device refrains from transmitting the disarm command signal and the activation signal, and
wherein entries on the list correspond to historical use of the doorbell device or the control panel device by the plurality of authorized users to enter and exit the region.

11. The doorbell device of claim 10 wherein, when the list fails to indicate that the one of the plurality of authorized users is located within the region, the transceiver device transmits the disarm command signal or the activation signal.

12. The doorbell device of claim 11 wherein, responsive to the transceiver device transmitting the disarm command signal or the activation signal, the programmable processor updates the list to add the one of the plurality of authorized users to the list.

13. The doorbell device of claim 12, wherein the database device is part of the control panel device, and wherein the transceiver devices transmits an update signal to the control panel device to update the list.

14. The doorbell device of claim 12, wherein the database device is part of a cloud server device, and wherein the transceiver devices transmits an update signal to the cloud server device to update the list.

15. The doorbell device of claim 10, wherein the database device is part of the control panel device, and wherein the transceiver device communicates with the control panel device to access the list, identify the one of the plurality of authorized users, and determine whether the list indicates that the one of the plurality of authorized users is located within the region.

16. The doorbell device of claim 10, wherein the transceiver device receives access credentials with the request signal, and wherein the programmable processor determines whether the access credentials are valid and refrains from accessing the list when the access credentials are invalid.

17. The doorbell device of claim 10 wherein, when the transceiver device refrains from transmitting the disarm command signal or the activation signal, the programmable processor initiates a security action.

18. The doorbell device of claim 10, wherein the database device is part of a cloud server device, and wherein the transceiver device communicates with the cloud server device to access the list, identify the one of the plurality of authorized users, and determine whether the list indicates that the one of the plurality of authorized users is located within the region.

\* \* \* \* \*